United States Patent [19]

Stephens

[11] 4,261,331
[45] Apr. 14, 1981

[54] TEMPERATURE RESPONSIVE OPTICAL SWITCH

[75] Inventor: Richard B. Stephens, Murray Hill, N.J.

[73] Assignee: Exxon Research and Engineering Company, Florham Park, N.J.

[21] Appl. No.: 45,223

[22] Filed: Jun. 4, 1979

[51] Int. Cl.³ .............................................. F24J 3/02
[52] U.S. Cl. .................................. 126/418; 126/422; 126/417; 350/267; 350/353; 136/246
[58] Field of Search ............... 126/418, 422, 417, 432, 126/452, 900; 350/267, 353, 367; 136/89 PC

[56] References Cited

U.S. PATENT DOCUMENTS

| | | | |
|---|---|---|---|
| 2,501,418 | 3/1950 | Snowden, Jr. ....................... | 350/267 |
| 3,169,163 | 2/1965 | Nassenstein .......................... | 350/353 |
| 3,384,324 | 5/1968 | O'Sullivan, Jr. | |
| 3,470,049 | 9/1969 | Reusch ................... | 350/353 |
| 3,580,079 | 5/1971 | Crites ................................ | 350/353 X |
| 3,723,349 | 3/1973 | Heseltine et al. ..................... | 252/408 |
| 3,790,250 | 2/1974 | Mitchell et al. ................. | 350/160 R |
| 4,167,934 | 9/1979 | Miles .................................... | 126/422 |
| 4,169,661 | 10/1979 | Yamada et al. ....................... | 350/353 |

FOREIGN PATENT DOCUMENTS 2454206  5/1976  Fed. Rep. of Germany .......... 126/422

*Primary Examiner*—James C. Yeung
*Assistant Examiner*—Larry Jones
*Attorney, Agent, or Firm*—Paul E. Purwin

[57] ABSTRACT

An optical switching device for reflecting incident light at or above a predetermined temperature comprises a layer of a metal sulfate salt solution in thermal contact with a source of heat. The solution is characterized as having decreasing salt solubility with increasing temperature. When the heat source exceeds a predetermined temperature, the solution precipitates a light scattering layer, substantially reflecting incident light.

Embodied in a solar panel, the present invention provides automatic over-temperature control, reflecting light from the energy converter whenever panel temperature exceeds a predetermined limit.

9 Claims, 3 Drawing Figures

TEMPERATURE RESPONSIVE OPTICAL SWITCH

BACKGROUND OF THE INVENTION

The present invention relates to optical switching devices and in particular to a thermally responsive optical switching device which provides over-temperature protection to solar thermal collectors.

Rising fuel costs and the general desirability of energy independence has bolstered the development of solar energy alternatives to typical fossil fuel home heating. Solar thermal energy converters have been proposed as viable alternatives for petrochemical and similarly conventional home heating means. Manufacturers of lower temperature home heating collectors have continually sought lower cost alternatives to improve the economic effectiveness of solar energy. An approach taken by a number of solar panel manufacturers is to substitute plastic components for the more costly copper and other metallic components. See, for example, U.S. Pat. Nos. 3,918,430 and 4,046,135. Although plastic components may readily be substituted for many typical collector parts, these plastic components conventionally have upper working temperature limits in the general operating temperature range of the collector. These plastic components function successfully under normal collector system operation. However, in the instance where the collector's heat transfer means is interrupted, the temperature of the collector may rise substantially. The temperature in a conventional flat plate collector in the absence of interruption of heat exchange means may exceed 150° C. A limited number of plastics can withstand these temperatures and plastics capable of withstanding these temperatures are generally more costly than their metal counterparts.

Numerous devices have been proposed to provide over-temperature protection for solar collector devices. These devices may be generally categorized as either mechanical or optical means for inhibiting light from reaching the absorber surface. Prior teachings have been directed principally toward mechanical devices for reducing the amount of light reaching the solar absorbing surface. Examples of such devices may be found in U.S. Pat. No. 3,822,692 and U.S. Pat. No. 3,964,464. Such devices add to the cost, complexity and weight of the solar panel making the panel less desirable both from a technical and economic viewpoint.

PRIOR ART

Temperature responsive optical devices for providing light filtration are known in the art. Chalcogenide glassy semi-conductors such as those described in U.S. Pat. No. 3,790,250, for example, display temperature dependent light transmission characteristics. Similarly, thermochromic materials such as those disclosed in U.S. Pat. No. 3,723,349 display temperature dependent color changes. The basis of operation for these devices are materials which display a temperature dependent coefficient of absorption. Such filtering devices are prohibitively expensive for use in large area devices such as solar panels. Furthermore, the filtration is achieved by absorption. Therefore, the filter itself heats up, necessitating filter positioning apart from temperature sensitive components. In contrast, the present invention utilizes optical reflection to provide over-temperature protection for a solar collector panel. A temperature responsive phase change of an initially transparent fluid precipitates an optically reflective layer reducing the amount of light reaching the solar absorber, thereby reducing the temperature of the solar panel.

An example of a temperature sensitive optical switching device which utilizes phase change techniques to achieve filtration may be found in U.S. Pat. No. 3,384,324. This disclosure teaches the use of a semi-opaque light absorbing paraffin which, upon reaching its melting temperature, becomes substantially transparent, exposing an underlying reflective surface. This underlying surface reflects incident light energy; the reduced absorption results in the cooling of the optical device and attachments thereto. In the present invention, an originally transparent fluid media transforms into a reflective layer at a predetermined elevated temperature unlike the prior art device which transforms from an absorbing media to a transparent media at elevated temperatures.

SUMMARY OF THE INVENTION

The present invention provides a phase change activated temperature responsive switch useful in solar energy conversion devices. A solution whose solute is characterized as having solubility which is inversely proportional to increasing temperatures is interposed between a source of light energy and a light absorbing surface with a solar collector. An initial concentration of the solute is selected to produce saturation of the solution at a predetermined elevated temperature. In the operation of the solar panel should the temperature of the absorbing surface reach this preselected temperature, precipitation of the solute will be initiated. The precipitant is of the form of relatively small crystallites which form a highly dispersive layer, coating the solar absorbing surface. This coating of precipitate provides an optical scattering layer which reflects a substantial amount of incident light. This reduces the amount of light reaching the collecting surface and thereby reduces the temperature of the solar panel which concurrently reduces the temperature of the solution. As the temperature of the solution decreases, the precipitant redissolves into solution transforming into an optically transparent layer. The typical operation of the solar panel is then resumed. In this manner, automatic temperature limit protection is provided for solar panels. The present invention provides a simple economical temperature responsive optical switch for large area devices, which automatically provides temperature limitation for solar panels and similar such devices.

DETAILED DESCRIPTION OF THE INVENTION

The present invention provides a thermally responsive optical switch for controllably reflecting incident light. A thermally initiated phase change of an optically transparent fluid medium precipitates a light scattering layer resulting in substantial reflection of incident light. The optical device is capable of automatically controlling the maximum temperature of a solar thermal energy conversion device by reflecting incident light energy whenever the device temperature exceeds a predetermined limit.

Figure 1:
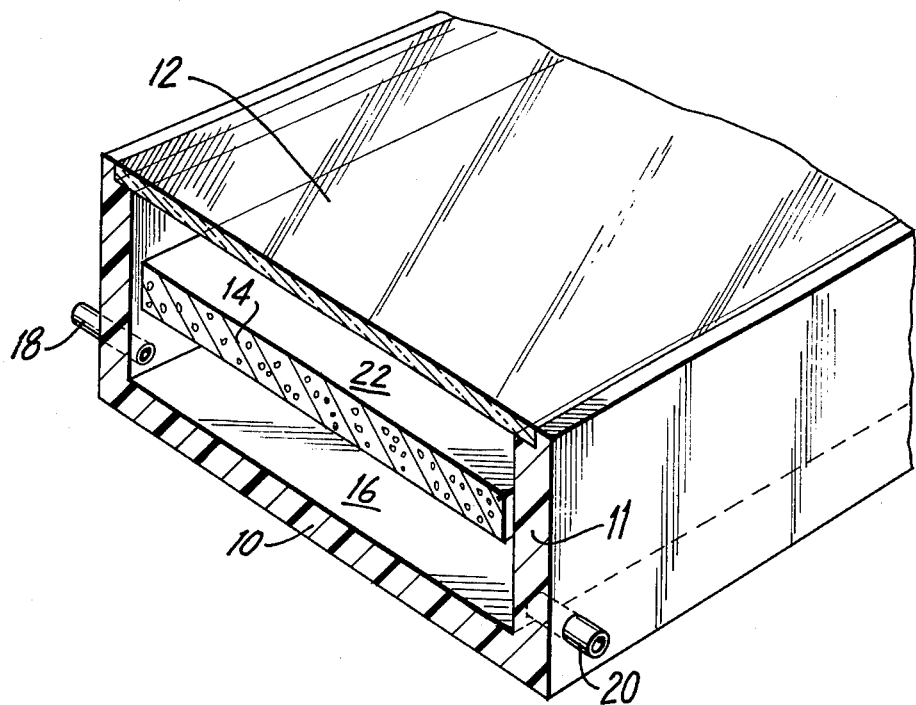
FIG. 1 is a view in perspective of the optical switch of the present invention embodied in a solar thermal energy conversion device.

As illustrative thereof, in FIG. 1 there is shown the optical switching device of the present invention embodied in a solar energy converter. The solar energy converter, hereinafter referred to as a solar panel, is a conventionally arranged solar collection device having a thermally insulated base and sidewalls 10 and 11, respectively, and a generally upwardly facing transparent window 12 comprising a major area surface of said panel. A solar absorbing layer 14 may comprise any of a number of radiation absorbing materials such as black paint, black plastic and electroplated black chrome, known in the art to efficiently absorb solar radiation and generally described as having a surface region characterized as displaying an absorption coefficient in excess of 0.90 throughout solar radiation wavelengths. Absorber layer 14, here shown as vertically supported by sidewalls 11, defines a thermal exchange plenum 16 between said layer 14, base 10 and sidewalls 11. In the operation of the solar panel, a thermal exchange media (not shown) such as air or water fills plenum 16. Inlet and outlet conduits 18 and 20, respectively, provide means for filling and extracting the thermal exchange media from said plenum.

A second plenum 22 is defined by the upward facing surface of said absorber layer 14, the sidewalls 11 and the transparent window 12. Plenum 22 is filled with an optically transparent solution (shown in FIG. 2 as 32) comprising a metal sulfate salt dissolved in a liquid solvent. This salt is characterized as having decreasing solubility with increasing solution temperature. That is to say, as the solution temperature increases, a decreasing percentage of the solute will be sustained in solution. Additionally, the solute plus solvent in solution form should display a relatively low value of optical absorption throughout that portion of the spectrum to be switched, i.e. visible and near I.R. light. A representative list of sulfate salts characterized by decreasing solubility in water with increasing solution temperature includes the following:

| Sulfate Salt | Solubility (grams solute/ 100 grams H$_2$O at given temperature) |
|---|---|
| Th(SO$_4$) | 4.04 @ 40° C., 2.54 @ 50° C., 1.63 @ 70° C. |
| Zn(SO$_4$) | 86.6 @ 80° C., 83.7 @ 90° C., 80.8 @ 100° C. |
| Ce(SO$_4$) | 6.05 @ 40° C., 3.42 @ 50° C., 2.35 @ 60° C., 1.01 @ 80° C., 0.42 @ 100° C. |
| Fe(SO$_4$) | 50 @ 70° C., 43 @ 80° C., 37 @ 90° C. |
| Mn(SO$_4$) | 58.17 @ 50° C., 55 @ 60° C., 52 @ 70° C., 48 @ 80° C., 42.5 @ 90° C., 34 @ 100° C. |

Suitable solvent-solute combinations are additionally characterized as having a sufficiently large solubility to temperature dependence and a sufficient room temperature solutility that a substantial amount of solute can be precipitated out of a reasonable amount of fluid. The preferred salt, magnesium sulfate, displays a high room temperature solubility in solvent systems amenable to use in a solar collector and has a strong temperature dependence of solubility.

The solution is prepared at or near room temperature dependent upon the particular solubility characteristics of the solute. The solute containing solution is optically transparent to light of frequencies of the range 0.3 to 1.3 microns. The solution is placed into plenum 22 where, in the operation of the solar panel, light passes through the solution and is incident upon the absorbing layer 14. In a preferred embodiment, the solution completely fills plenum 22 and contacts both the absorbing layer 14 and the transparent window 12. In this manner, the light passing through the window 12, the solution and being incident upon the collecting layer 14 will pass through a reduced number of media interfaces. This helps minimize the total reflected (wasted) light energy. It is further preferred that for use of a solar absorbing layer, which in and of itself reflects a portion of the incident light energy (instead of absorbing), the combined thickness of the glass and the solution layers serves as an anti-reflective coating of the underlying solar absorbing layer.

Figure 2:
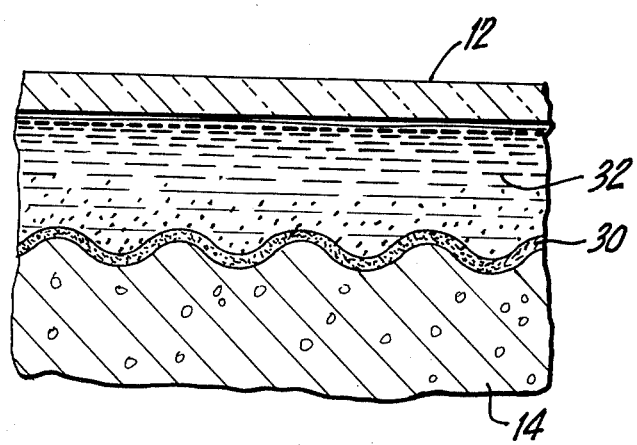
FIG. 2 is an enlarged view of a segment of the solar absorbing surface of FIG. 1, showing the optical switching device of the present invention.

The absorption of light by layer 14 converts the light energy into heat energy. In the typical operation of the solar panel, the heat energy generated in the absorbing layer 14 is transferred to the thermal exchange fluid filling plenum 16 to be utilized elsewhere (not shown) in the energy conversion system. In the present invention, the temperature of the solution increases with increasing panel temperature. As the temperature of the solution increases, the solubility of the salt solute decreases until, at a predeterminable temperature, the solution becomes saturated and precipitation of the solute initiates. The initial concentration of the solution prepared typically at or near room temperature in conjunction with the relationship between temperature and solute solubility for the particular salt dictates the temperature at which precipitation initiates. Referring now to FIG. 2, as solution 32 reaches a predetermined temperature, a precipitate of the solute in the form of relatively small crystallites forms a light scattering layer 30. Although the crystalline material is inherently transparent, the dispersive nature of the film formed by a large number of relatively small crystallites results in an optically scattering layer capable of reflecting a substantial amount of the incident light. The reflection of this light reduces the amount of light reaching the collecting surface 14 therein reducing the temperature of the solar panel. As the temperature of the solar panel is reduced and concurrently the temperature of solution 32, the solute redissolves into solution transforming again into a transparent fluid. Conventional operation of the solar panel is then resumed. In this manner, a limitation on panel temperature may be automatically maintained without the need for mechanical devices which are not only costly but must be maintained and serviced over the lifetime of the solar panel.

Figure 3:
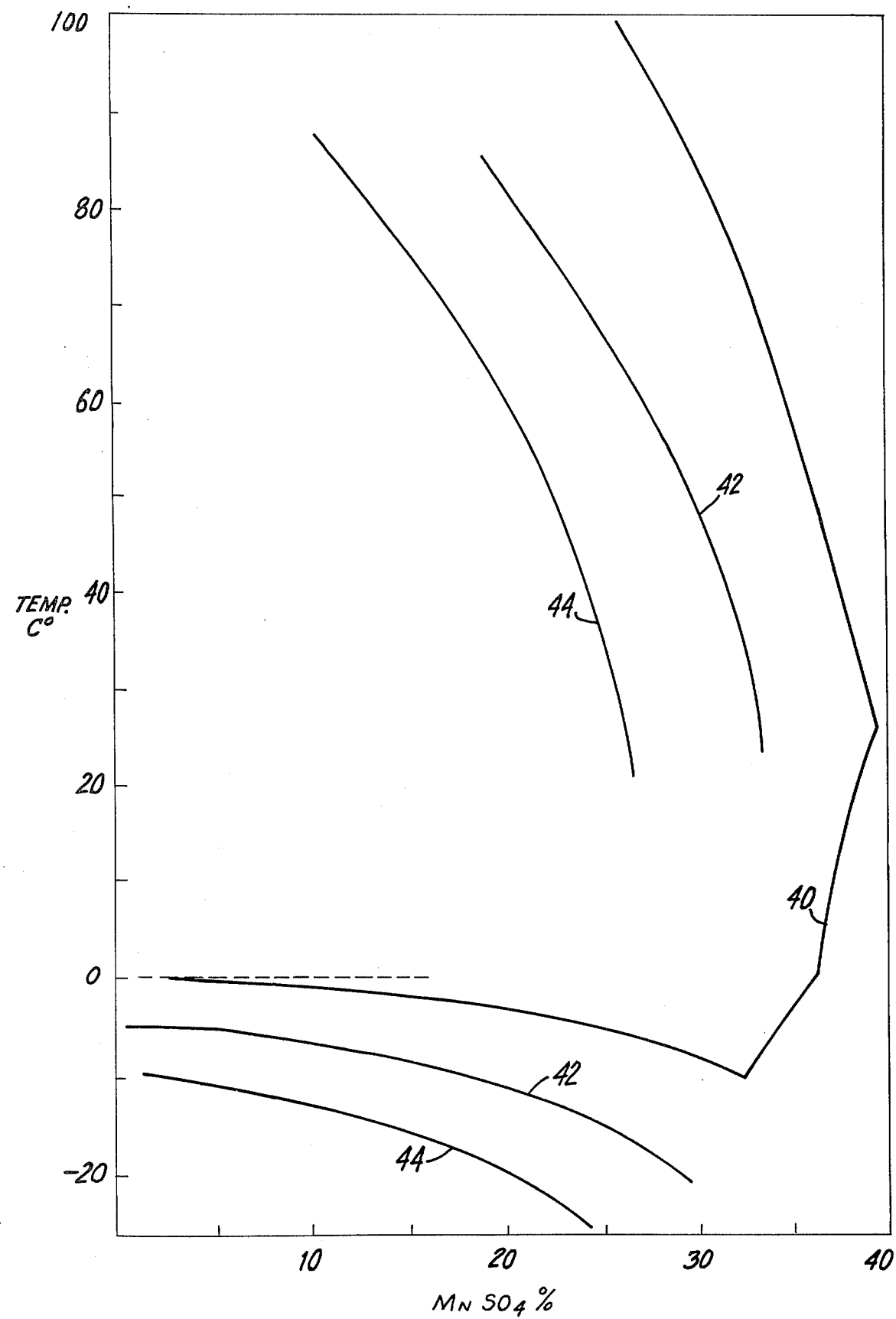
FIG. 3 is a diagram of the solubility curves of manganese sulfate in solvent solution with water, a mixture of water and 10% ethylene glycol and a mixture of water and 20% ethylene glycol.

In a preferred embodiment of the present invention, the solution 32 comprises 30% by weight of manganese sulfate dissolved in water. The solution may be prepared at or near room temperature. For purposes of this invention, room temperature may be defined as that temperature between 22° and 27° C. Referring momentarily to FIG. 3, there is shown at 40 a graphic illustration of the interdependence of temperature and solubility for a manganese sulfate solute, MnSO$_4$, in a water solvent solution. As noted in FIG. 3, increasing solution temperature from about 25° C. on upward decreases the solubility of the manganese sulfate solute. As the temperature of the solution increases, the solubility level approaches and reaches the solution concentration of 30%. When the solubility level equals or falls below the initial solution concentration, saturation and super-saturation of the solution occurs and a crystalline precipitate of the manganese sulfate solute forms. It has been observed under laboratory conditions that precipitation of manganese sulfate solute initiates at the absorber surface 14 which is expectedly higher in temperature. It has been further observed that precipitation will be initiated by the formation of gas bubbles which appear at the heated absorbing surface 14 at or near the solution boiling temperature. It is believed that these gas bubbles locally super-saturate the solution, initiating precipitation. The precipitate is of the form of relatively small crystallites. Although crystalline manganese sulfate is transparent, the substantially large number of relatively small crystallites having a refractive index between about 1.52 and 1.58 forms a dispersive light scattering layer in the principally water solution which has an index of refraction about equal to 1.33. This layer shown in FIG. 2 at 30 reflects a substantial portion of the incident light. Should panel temperatures continue to increase precipitation will occur throughout solution layer 32. The added precipitant will increase the thickness of scattering layer 30, increasing the amount of light reflected by this layer. This reduces the amount of light energy reaching the absorbing layer 14 resulting in a reduction of panel temperature. Referring again to FIG. 3, along with FIG. 2, as the temperature of the solar panel decreases and correspondingly the temperature of solution layer 14 decreases, the solubility of the manganese sulfate increases. As the temperature falls below the preselected temperature limit, the precipitant forming the scattering layer 30 begins to redissolve. Under laboratory conditions, it has been observed that the rate of dissolution is dependent upon the temperature and agitation of the solution and may extend over a period of several minutes. The term agitation here refers to the thermally induced currents generated within the solution layer 32. The manganese sulfate redissolves into solution, transforming into an optically transparent layer, whereupon normal operation of the solar panel resumes. The aforedescribed sequence of precipitation, cooling and redissolving provides automatic temperature limit control for solar panels and similar such devices.

It is to be realized that solar panels operating at higher latitudes will require panel angulation or tilting to maximize their collection of sunlight. Increasingly acute angulation may defeat the precipitant switching device by accumulating the precipitant at lower portions of the panel, leaving upper sections of the collector surface exposed to create localized high temperature regions. To avoid this problem, plenum 22 may be subdivided into a plurality of chambers. For example, an optically transparent honeycomb shaped partition may be interposed between the transparent window 12 and the solar absorbing layer 14. Such a subdivision of the absorbing surface more uniformly distributes the participant scattering layer 30 and simultaneously increases the efficiency of the energy converter since thermal conduction losses are reduced.

It should further be recognized that the design of solar panels in many applications must provide lower temperature protection against freezing of liquids within the converter. To this end, the inventor has evaluated the use of alcohol additives in the present invention. Referring again to FIG. 3, the curve designated 42 represents the solubility of manganese sulfate in a solvent comprising a mixture of 5 mol % of ethylene glycol in solution. The solidus curve for this solution is lowered by 5° to 10° C. from that of the pure $MnSO_4$-water mixture (depending on $MnSO_4$ concentration). Similarly, the curve designated 42 represents the solubility of manganese sulfate in a solvent comprising a mixture of 11 mol % of ethylene glycol in solution. The solidus curve for this solution is lowered by 10°-25° C. from that of the pure $MnSO_4$-water mixture. The addition of ethylene glycol generally reduces the solubility of the manganese sulfate, initiating solution saturation at a lower temperature for a given starting solute concentration. By evaluating the temperature dependence of the solubility of the solute in the particular solvent to be used, one may select the temperature limit range of operation of the optical switch by varying the initial concentration of the solute in solution. For example, if the desired temperature limit was about 80° C., a solution of about 20% $MnSO_4$ in mixed solvent of 5 mol % ethylene glycol in water or about 13% $MnSO_4$ in a mixed solvent of 11 mol % ethylene glycol in water would initiate precipitation at or near the aforedescribed temperature limit.

Although the present invention has been described as utilizing precipitants comprising metal sulfate salts, it is presently believed that several alternate embodiments may include solutes selected from those described herebelow in Table I:

TABLE I

| Material | Solvent | g at % | | |
|---|---|---|---|---|
| $CaSeO_4$ | $H_2O$ | 8 | @ 20° C. | 5 @ 70° C. |
| $Na_2(SeO_4)_3$ | $H_2O$ | 40 | 20 | 5 @ 80 |
| $Sm_2(SeO_4)_3$ | $H_2O$ | 45 | 20 | 5 @ 80 |
| $Ce_2(SeO_4)_3$ | $H_2O$ | 35 | 20 | 5 @ 80 |
| $Ce_2(SO_4)_3$ | $H_2O$ | 9 | 20 | 1 @ 80 |
| $CdSeO_4$ | $H_2O$ | 40 | 20 | 25 @ 80 |
| Ca-Diethylacetate | $H_2O$ | 26 | 20 | 18 @ 70 |
| Ca 3 methyl pentanate | $H_2O$ | 17 | 20 | 10 @ 90 |
| $[(C_3H_7)_2CHCOO]_2Ca$ | $H_2O$ | 7 | 20 | 1 @ 90 |

The following examples are included in order to further assist one skilled in the art to practice this invention.

EXAMPLE 1

A solution containing 30% by weight $Mn(SO_4)$ in water was slowly heated in a glass container while monitoring the temperature of the solution. At solution temperatures just below 100° C., extremely fine crystallites formed contiguous to gas bubbles formed at the heated glass surface. Increasing the temperature to between 100° C. and 104° C., the crystals precipitate throughout the solution, forming an initially pinkish white semi-translucent layer changing to an opaque white layer of crystallite precipitate. The liquid was then slowly cooled. At 70° C. the solution remained opaque. At about 60°, the precipitant redissolved and the solution was again transparent.

The solution is transferred to a conventional solar panel similar to that described in FIG. 1. The solution fills a volume between the collector surface and the light transparent window. The depth of solution measured from the window toward the collector surface is less than about one-half inch. Several conventional thermocouples are utilized to monitor the temperature of both the collector surface and the liquid contiguous thereto. A solar simulator comprising a short arc zenon light source is utilized in lieu of direct sunlight exposure to facilitate experimental control over panel temperatures. The illumination level is increased until the collector surface is about 100° C., the fluid being slightly lower in temperature. The illumination is then further increased whereupon reaching a collector surface temperature between about 100° C. and 104° C., crystallites begin forming, initiating at the collector surface/solution interface. The temperature of the panel is dropped to about 95° C. while the irradiance level remains unchanged. The collector surface is sparsely covered with precipitant comprising small crystallites of $MnSO_4$. The solar simulator intensity level is then sharply increased to cause a sudden rise in collector temperature. As the solution temperature responds to the increase in collector temperature, that is as the solution reaches a temperature of about 104° C., crystallites form throughout the solution, rendering it substantially opaque. The collector temperature falls below 100° C. while the irradiance level remains virtually unchanged. The irradiance level is then reduced to an intensity which would sustain a panel temperature of about 95° C. to 100° C. However, the collector and solution temperature continues to fall as incident light is reflected by the precipitant layer. At a solution temperature of between about 60° C. and 65° C., the precipitate slowly redissolves and the panel temperature increases to just below about 100° C.

What is claimed is:

1. Means for providing automatic over-temperature protection for solar thermal energy conversion devices by controllably reflecting incident light energy whenever said device exceeds a predetermined temperature limit, said means comprising:

solar radiation absorbing means for converting light energy into heat energy;

a layer of optically transparent fluid, contiguous to said solar radiation absorber and interposed between said absorber and a source of said light energy;

a predetermined amount of a solute comprising a metal sulfate salt in solution with said fluid, said solute being characterized as having decreasing solubility with increasing solution temperature, and said amount of solute being predetermined as the amount necessary to saturate said solution at said predetermined temperature limit;

container means having at least one optically transparent window, said container means retaining said fluid contiguous to said absorber and maintaining an interpositioning of said fluid between the radiation absorber and said transparent window whereupon said absorber attaining a predetermined temperature, said sulfate salt precipitates from said solution to form a light scattering layer between said absorber and said source of light energy, reflecting said light and reducing the temperature of the solar absorber.

2. The over-temperature protection means set forth in claim 1 wherein said metal sulfate salt comprises one or more of the group consisting of $Mn(SO_4)$, $Th(SO_4)$, $Th_2(SO_4)$, $Zn(SO_4)$, $Fe(SO_4)$ and $Ce(SO_4)$.

3. The over-temperature protection means set forth in claim 1 wherein said metal sulfate salt comprises manganese sulfate.

4. The over-temperature protection means set forth in claim 3 wherein said optically transparent fluid comprises water.

5. The over-temperature protection means set forth in claim 3 wherein said amount of solute comprising magnesium sulfate is about 30% by weight of said solution and said temperature limit is above about 100° C.

6. The over-temperature protection means set forth in claim 1 wherein said optically transparent fluid comprises a mixture of alcohol and water.

7. The over-temperature protection means set forth in claim 6 wherein said alcohol comprises ethylene glycol.

8. The over-temperature protection means of claim 1 wherein said solution is transparent to light of wavelengths between about 0.3 microns and 1.3 microns.

9. The over-temperature protection means of claim 1 wherein said precipitate is further characterized as comprising a plurality of relatively small essentially transparent crystallites having an index of refraction differing from the liquid surrounding said crystallites.

* * * * *